United States Patent

Kojima et al.

Patent Number: 5,447,969
Date of Patent: Sep. 5, 1995

[54] POLYURETHANE COMPOSITION

[75] Inventors: Yoshiaki Kojima; Akihiko Yoshizato, both of Moriyama, Japan

[73] Assignee: Asahi Kasei Kogyo Kabushiki Kaisha, Osaka, Japan

[21] Appl. No.: 64,006

[22] PCT Filed: Sep. 24, 1992

[86] PCT No.: PCT/JP92/01214
§ 371 Date: May 21, 1993
§ 102(e) Date: May 21, 1993

[87] PCT Pub. No.: WO93/06173
PCT Pub. Date: Apr. 1, 1993

[30] Foreign Application Priority Data

Sep. 24, 1901 [JP] Japan .................... 3-243446

[51] Int. Cl.$^6$ ............ C08K 9/00; C08K 9/10; C08J 3/00; C08L 75/00
[52] U.S. Cl. .................... 523/200; 523/210; 524/434; 524/436; 524/441; 524/589
[58] Field of Search ............ 523/200, 210; 524/434, 524/436, 441, 589

[56] References Cited

U.S. PATENT DOCUMENTS 4,675,356 6/1987 Miyata ........................ 524/436
4,729,854 3/1988 Miyata et al. ................ 524/436

FOREIGN PATENT DOCUMENTS 59-133248 7/1984 Japan .
60-1241 1/1985 Japan .
63-210165 8/1988 Japan .
63-265960 11/1988 Japan .
3-292364 12/1991 Japan .

*Primary Examiner*—Paul R. Michl
*Assistant Examiner*—P. Niland
*Attorney, Agent, or Firm*—Finnegan, Henderson, Farabow, Garrett & Dunner

[57] ABSTRACT

A polyurethane composition excellent in chlorine resistance containing 0.1 to 10% by weight, based on the polyurethane, of hydrotalcite which has water of crystallization and a $C_{10}$–$C_{30}$ fatty acid adhered thereto, capable of being stably spun over a long period of time, and exhibiting neither discoloration in the step of tannin solution treatment nor swelling during chlorine immersion treatment.

1 Claim, No Drawings

POLYURETHANE COMPOSITION

TECHNICAL FIELD

The present invention relates to a composition for polyurethane elastic fibers to prevent deterioration in various chlorinated water environments.

BACKGROUND ART

Polyurethane elastic yarn obtained from 4,4'-diphenylmethane diisocyanate, a polyhydroxy polymer having a relatively low degree of polymerization and a compound containing polyfunctional active hydrogen, has a high degree of rubber elasticity, is excellent in mechanical properties such as tensile stress and resilience and has an excellent thermal behavior. Therefore, much attention has been called to this yarn as a functional fiber material for foundation garments, socks, sportswear, and the like.

However, it is known that, when such products composed mainly of a long chain segmented polyurethane are washed with chlorine bleach, a marked deterioration in the physical properties of the segmented polyurethane takes place.

Moreover, it is known that, when swimsuits composed of polyurethane elastic yarn and polyamide yarn are exposed to chlorinated water in a swimming pool having an active chlorine concentration of 0.5 to 3 ppm, deterioration of the physical properties of the polyurethane elastic yarn and discoloration and fading of dyestuff adhering to the polyamide yarn occur.

Accordingly, for the purpose of improving chlorine resistance of the polyurethan elastic yarn used for swimming race suits worn in swimming pools, a polyurethane prepared by the use of a polyester, as a polyhydroxy polymer having a low degree of polymerization, which is made more excellent in chlorine resistance due to the molecule bonding viewpoint thereof, has been mainly used. However, an aliphatic polyester has high biological activity, and therefore, the polyester based polyurethane has a disadvantage that it is likely to be attacked by fungi. In addition, the chlorine resistance of the polyester based polyurethane has not been satisfactory. Moreover, treatments of the polyester based polyurethanes with a tannin solution after dyeing treatments are currently widely used as a method for preventing swimsuits from becoming discolored an faded by chlorine.

Various additives have heretofore been proposed to improve the resistance of the polyurethane elastic yarn to chlorine-induced deterioration. For example, Japanese Unexamined Patent Publication (Kokai) No. 57-29609 discloses zinc oxide as an additive.

However, zinc oxide has a disadvantage that it is removed from the yarn by dyeing treatment thereof in an acidic condition (pH 3–4), and the remaining amount of zinc oxide therein is markedly decreased, whereby the chlorine resistance is also greatly lowered.

The present applicant has previously proposed a polyurethane composition in which the chlorine resistance is improved by the use of hydrotalcite, as a polyurethane composition with improvements over the drawbacks as mentioned above (see Japanese Unexamined Patent Publication No. 59-133248). A less amount of hydrotalcite dispersed in polyurethane elastic yarns is removed therefrom even in dyeing treatment in an acidic condition (pH 3–4), and thus excellent chlorine-resistant properties are realized.

However, hydrotalcite is very likely to agglomerate in polar solvents such as dimethylacetamide and dimethylformamide which are solvents for polyurethane used during spinning. As a result, a rise in discharge pressure and yarn breakage are observed in the process of spinning, and it has been found that stabilized spinning of the yarn over a long period of time is difficult. Furthermore, it has been found that phenomena as described below take place when yarn obtained from the polyurethane composition is used for swimming race suits. That is, the yarn is turned brown in the process of tannin solution treatment for preventing dyestuff for polyamide from being discolored by chlorine; and the yarn swells when immersed in chlorinated water.

DISCLOSURE OF THE INVENTION

Accordingly, an object of the present invention is to provide a hydrotalcite-containing polyurethane composition capable of being stably spun over a long period, exhibiting neither discoloration in the process of tannin solution treatment nor swelling when immersed in chlorinated water, and having excellent chlorine resistance.

In accordance with the present invention, there is provided a polyurethane composition comprising 0.1 to 10% by weight, based on the polyurethane, of a hydrotalcite having water of crystallization and a $C_{10}$–$C_{30}$ fatty acid adhered thereto.

In accordance with the present invention, there is also provided a polyurethane dope comprising the above-mentioned polyurethane composition and an organic solvent capable of dissolving a polyurethane.

In accordance with the present invention, there is further provided a method for producing a polyurethane dope, which comprises dispersing a hydrotalcite having water of crystallization and a $C_{10}$–$C_{30}$ fatty acid adhered thereto in an organic solvent capable of dissolving polyurethane so that the hydrotalcite has an average secondary agglomeration particle size of 10 μm or less, or wet grinding the hydrotalcite therein so that the hydrotalcite has an average secondary agglomeration particle size of 5 μm or less, and mixing the resultant dispersion with polyurethane.

BEST MODE FOR CARRYING OUT THE INVENTION

The present inventors have carried out extensive research on developing a hydrotalcite-containing polyurethane composition capable of being stably spun over a long period, exhibiting no discoloration, swelling, etc., in the process of a tannin solution treatment, and having excellent chlorine resistance. As a result, we have found that hydrotalcites treated with a fatty acid and having water of crystallization are suitable for the above-mentioned objects. The present invention has been achieved on the basis of this foundings.

Hydrotalcites according to the present invention are represented by the formula (1):

$$M^{2+}{}_x Al_2(OH)_{2x+6-nz}(A^{n-})_z \cdot mH_2O \qquad (1)$$

wherein $M^{2+}$ is at least one metal element selected from the group consisting of $Mg^{+2}$ and $Zn^{+2}$, $A^{n-}$ is an anion having a valence of n as $OH^-$, $F^-$, $Cl^-$, $Br^-$. $NO_3^-$, $CO_3^{2-}$, $SO_4^{2-}$, $Fe(CN)_6^{3-}$, $CH_3COO^-$, oxalate ion or salicylate ion, and n is the valence of said anion, x is a positive numerical value of at least 2, z is a positive numerical value of 2 or less and m is a positive numerical value.

Preferable examples of the hydrotalcites of the present invention are compounds having the following formulae (2), (3), (4), (5) and (6):

$$Mg_8Al_2(OH)_{20}CO_3 \cdot 6H_2O \quad (2)$$

$$Mg_{4.7}Al_2(OH)_{13.4}CO_3 \cdot 3.7H_2O \quad (3)$$

$$Mg_{4.5}Al_2(OH)_{13}CO_3 \cdot 3.5H_2O \quad (4)$$

$$Mg_{3.9}Al_2(OH)_{5.8}CO_3 \cdot 2.7H_2O \quad (5)$$

$$Mg_3Al_2(OH)_{10}CO_3 \cdot 1.7H_2O \quad (6)$$

The hydrotalcites according to the present invention must have water of crystallization. When a sintered anhydrous hydrotalate is used, polyurethane yarn is turned brown in the step of tannin solution treatment, and swells when immersed in chlorinated water. When a hydrotalcite having water of crystallization is used, such phenomena can be inhibited.

Fatty acids usable in the present invention are mono- or di-carboxylic acids having a straight- or branched chain hydrocarbon group having 10 to 30 carbon atoms. Preferable examples of such fatty acids are capric acid, lauric acid, myristic acid, palmitic acid, stearic acid, behenic acid and the like.

Coating hydrotalcite particles with a fatty acid can be mentioned as an example of a method for allowing a fatty acid to adhere to the hydrotalcite. Other various known methods may also be used.

Specifical examples of the coating method include a method wherein a hydrotalcite and 0.1 to 20% by weight, based thereon, of a fatty acid are placed in a Henschel mixer, and heated while stirring; and a method wherein a hydrotalcite and 0.1 to 20% by weight, based thereon, of a fatty acid dissolved in a suitable organic solvent (e.g., alcohols or chlorinated hydrocarbons) are mixed in a conical dryer, and the solvent is removed after the mixing treatment. The amount of the fatty acid adhered can be determined from the change in weight of the hydrotalcite before and after the fatty acid treatment.

Hydrotalcites are extremely liable to secondarily agglomerate in a polar solvent used as a dry spinning solvent of polyurethane, such as dimethylacetamide, dimethylformamide and dimethylsulfoxide, and, as a result, a rise in an extruding pressure and yarn breakage in the process of spinning polyurethane are caused. When the hydrotalcite treated with the fatty acid according to the present invention alleviates the degree of secondary agglomeration in the polar solvent probably due to the change in the surface charge state thereof, and the average secondary agglomeration particle size becomes 10 μm or less, and the spinning properties of the polyurethane are remarkably improved. A preferable average secondary agglomeration particle size is 10 to 1 μm. Dispersion of the hydrotalcite in an organic solvent in the present invention can be carried out by conventional methods by, for example, a homomixer. Hydrotalcite having an average secondary agglomeration particle size of 5 μm or less may also be obtained by wet grinding hydrotalcite using, for example, a ball mill.

Furthermore, when the hydrotalcite treated with a fatty acid as mentioned in the present invention is used, the phenomena such as turning brown of the polyurethane yarn during the tannin solution treatment, and swelling during chlorinated water immersion can be improved.

In the present invention, the content of the hydrotalcite having water of crystallization and the fatty acid to be adhered is 0.1 to 10% by weight, preferably 0.3 to 8% by weight, and more preferably 0.5 to 5% by weight, based on the polyurethane. When the addition amount of these compounds is less than 0.1% by weight, the chlorine deterioration prevention effect is unsatisfactory. When the addition amount thereof is more than 10% by weight, it is not preferable because the physical properties of the fibers are adversely affected. The polyurethane usable in the present invention (sometimes referred to as "segmented polyurethane" hereinafter) comprises, as the principal constituents, a substantially linear polymer such as homopolymer or copolymer having hydroxyl groups at both molecule ends and a molecular weight of 600 to 4000, such as polyester diol, polyether diol, polyesteriamidodiol, polycarbonate diol, polyacryl diol, polythioester diol, polythioether diol, polyhydrocarbondiol, or a mixture or copolymers of these substances, an organic diisocyanate, and a chain extender having polyfunctional active hydrogen atoms, such as polyol, polyamine, hydroxylamine, hydrazine, polyhydrazide, polysemicarbazide, water or a mixture thereof.

In the present invention, the hydrotalcites having water of crystallization and fatty acid adhered thereto may be used, in combination with other compounds conventionally used for polyurethane elastic yarn, for example, an ultraviolet light absorber, an antioxidant, a light stabilizer, a gas-resistant stabilizer, a coloring agent, a matting agent and a filler.

The hydrotalcite having water of crystallization and fatty acid adhered thereto is usually added to a polyurethane polymer solution prepared by reacting a polyurethane prepolymer with a chain extender. However, the hydrotalcite may also be previously added to these compounds, or may be added during polymerization.

A spinning stock solution (i.e., polyurethane dope) prepared by dissolving the polyurethane composition of the present invention in a polar solvent such as dimethylacetamide, dimethylformamide or dimethylsulfoxide exhibits an extreme decrease in the rise of the extruding pressure and an extremely low frequency of yarn breakage in the spinning process, and therefore can be stably spun over a long period of time. Among those, a preferable polyurethane dope substantially comprises 15 to 45% by weight of the polyurethane composition of the present invention and a polar solvent, and a more preferable polyurethane dope substantially comprises 20 to 40% by weight thereof and a polar solvent.

The elastic fibers obtained from the polyurethane composition of the present invention has excellent resistance to deterioration incurred by chlorine, and in addition the polyurethane elastic yarn neither discolors even when treated with tannin solution nor swells in chlorinated water.

Since the polyurethane elastic yarn prepared from the composition of the present invention does not lose the chlorine-resistant stabilization effect thereof to a large extent, even when dyed and subsequently further treated with tannin solution, it is extremely useful as a swim wear material repeatedly used over a long period in swimming pools containing chlorine.

The polyurethane composition of the present invention may also be used as films, elastomers, foam materials, and the like in addition to use for elastic fibers.

EXAMPLES

The present invention will now be explained in more detail with reference to Examples and Comparative Examples, but it should be understood that the present invention is by no means limited to these Examples.

Various measurements and pretreatment of fibers described in the following Examples were carried out by procedures as described below.

(Measurement of Average Secondary Agglomeration Particle Size of Hydrotalcite)

A dope containing 13% by weight of hydrotalcite dispersed in dimethylacetamide is diluted with dimethylacetamide, to the 0.5% by weight content of the hydrotalcite. The diluted dope is photographed through an optical microscope. The weight average particle size thereof is obtained from the photograph using an image analysis file system (trade name of IP-1000, manufactured by Asahi Chemical Industry Co., Ltd.).

(Measurement of Available Chlorine Concentration)

A chlorinated water sample in an amount of 25 ml is weighed out in a 100 ml Erlenmeyer flask, and after adding 2 g of dried potassium iodide thereto, the sample is shaken to be mixed. The resultant solution is titrated with a 1/100N sodium thiosulfate solution, and a starch solution is added thereto when the titrated solution turns pale yellow from orange. The titration therewith is continued until the blue color of the solution produced by the starch-iodine reaction disappears. Separately, 25 ml of ion-exchanged water is collected, and the blank titration amount thereof is obtained in the same manner as described above. The available chlorine concentration H is given by the following formula:

$$H = [(0.003545(Vs - Vb) \times f)/Ws] \times 10^6 \quad (1)$$

wherein H is an available chlorine concentration (ppm), Vs is a titration amount (ml) of the 1/100N sodium thiosulfate solution at the time of titrating the chlorinated water, Vb is the titration amount (ml) thereof at the time of titrating the ion-exchanged water, f is the titer of the 1/100N sodium thiosulfate, and Ws is a weight (g) of the chlorinated water.

(Treatment under Dyeing Conditions)

A test yarn with an elongation of 50% is immersion treated for 1 hour in a boiling dye bath having a bath ratio of 1:30, containing 1.2% owf of a fluorescence dyestuff (trade name of Blankophor CL, manufactured by Bayer Ltd.), 0.4 g/l of a dyeing aid (trade name of Ionet Wrap 50, manufactured by Sanyo Chemical Industries, Ltd.) and having a pH value of 3.5 adjusted with acetic acid and sodium acetate. The yarn thus treated is washed with flowing water for 10 minutes.

(Tannin Solution Treatment)

The test yarn subjected to the treatment under the dyeing conditions is placed in a condition of 50% elongation in a solution containing 4.5 g of tannic acid (specially manufactured by Dainippon pharmaceutical Co., Ltd.) and 2.7 g of acetic acid in 6 liters of ion-exchanged water when the solution is at 25° C. The treatment solution is then heated to 50° C., and the test yarn is immersion treated therein for 30 minutes without further processing. The yarn thus treated is washed with flowing water for 10 minutes.

(Discoloration Degree Test in Tannin Solution Treatment)

The test yarn subjected to the tannin solution treatment is air dried at 20° C. for one day, and the discoloration degree is classified in accordance with the following criteria:

Fist class: the yarn exhibiting the same whiteness as an untreated yarn;
Second class: the yarn being slightly colored;
Third class: the yarn being lightly colored;
Fourth class: the yarn being colored; and
Fifth class: the yarn being strongly colored.

(Chlorine Immersion Treatment)

The test yarn subjected to the tannin solution treatment is immersed at an elongation of 50% in a solution at 30° C. for 8 hours prepared by diluting sodium hypochlorite solution (manufactured by Sasaki Yakuhin K.K.) with ion-exchanged water to have an available chlorine concentration of 3 ppm, and adjusting the pH to 7 with a buffer solution containing citric acid and sodium hydrogenphosphate.

(Swell Test of Yarn)

The swell $\Delta L$ of the test yarn having been subjected to the chlorine immersion treatment is represented by the following formula $$\Delta L = [(L - L_0)/L_0] \times 100$$

wherein $\Delta L$ is a swell (%) thereof, $L_0$ (cm) is the initial length thereof, and L (cm) is the length thereof after having been subjected to the chlorine immersion treatment.

(Chlorine Resistance Evaluation Test)

The test yarn subjected to the tannin solution treatment is immersed at an elongation of 50% in a solution at 30° C. prepared by diluting sodium hypochlorite solution (manufactured by Sasaki Yakuhin K.K.) with ion-exchanged water to have an available chlorine concentration of 3 ppm, and adjusting the pH to 7 with a buffer solution of citric acid and sodium hydrogenphosphate. Samples are sequentially taken every 8 hours (1 cycle), and the tenacity retention ratio $\Delta T$ is obtained from the following formula $$\Delta T = (TS/TS_0) \times 100$$

wherein $\Delta T$ is the tenacity retention ratio (%) of the sample, TS is the tenacity (g) thereof after the treatment, and $TS_0$ is the tenacity (g) thereof before the treatment. The chlorine resistance is evaluated in terms of time required for the yarn to have a tenacity retention ratio of 50%.

In addition, in Examples and Comparative Examples described below, the term parts signifies parts by weight, and the term % signifies % by weight, based on the total weight of fibers.

Example 1

Under a nitrogen gas stream, 133.3 parts of polytetramethylene glycol having an average molecular weight of 1,600 and 31.2 parts of 4,4'-diphenylmethane diisocyanate were reacted with each other with stirring at 95° C. for 90 minutes to obtain a prepolymer having remaining isocyanate groups. The resultant prepolymer was cooled to room temperature, and 270 parts of dried dimethyl acetamide was added thereto to dissolve the prepolymer and obtain a prepolymer solution.

On the other hand, 2.34 parts of ethylenediamine and 0.37 part of diethylamine were dissolved in 157 parts of dried dimethylacetamide, and the resultant solution was added to the prepolymer solution at room temperature to obtain a polyurethane solution having a viscosity of 1,500 poise at 30° C.

A dope containing 2% of 4,4'-butylidenebis(3-methyl-6-t-butylphenol), 0.7% of 2-(2'-hydroxy-3'-t-butyl-5'-methylphenyl)-5-chlorobenzotriazole and 13% by weight of a hydrotalcite having the following formula (7) to which a fatty acid listed in Table 1 was adhered, which a fatty acid listed in Table 2 was adhered was used, in place of the chlorine deterioration inhibitor in Example 1.

$$Mg_3Al_2(OH)_{10}CO_3 \cdot 1.7H_2O \tag{8}$$

The results are shown in Table 2.

TABLE 2

| Experiment No. | Fatty acid Type | Adhering Amount (%) | Average Agglomeration Particle Size (μm) | Addn. Amt. (%) | Amount of Yarn Breakage (times/hr) | Extruding Pressure Rise Rate (kg/cm²) | Discoloration Degree After Treatment with Tannin | Swell After Chlorine Immersion Treatment (%) | Chlorine Resistance (hr) |
|---|---|---|---|---|---|---|---|---|---|
| Ex. 2-1 | stearic acid | 3.0 | 9.0 | 1.0 | 0.04 | 1.0 | 2 | 32 | 46 |
| Ex. 2-2 | stearic acid | 3.0 | 9.0 | 3.0 | 0.10 | 1.7 | 2–3 | 34 | 63 |
| Ex. 2-3 | stearic acid | 3.0 | 9.0 | 5.0 | 0.30 | 3.3 | 3 | 37 | 80 |
| Comp. Ex. 4 | — | — | 16.9 | 3.0 | 124 | >100 | 4 | 44 | 61 |

Note:
Addn. Amt. = Addition Amount and prepared by dispersing these substances mentioned above in dimethylacetamide using a homomixer, was added to the viscous polymer solution thus obtained.

$$Mg_{4.5}Al_2(OH)_{13}CO_3 \cdot 3.5H_2O \tag{7}$$

The polymer solution was dry spun at a rate of 600 m/min at a hot air temperature of 330° C. to obtain a yarn having 40 denier/5 filaments.

The results are shown in Table 1.

The amount of yarn breakage in Table 1 designates

Example 3

The procedure of Example 1 was repeated, except that a hydrotalcite having the following formula (9) to which a fatty acid listed in Table 3 was adhered was used, in place of the chlorine deterioration inhibitor in Example 1.

$$Mg_{4.5}Al_2(OH)_{13}CO_3 \tag{9}$$

The results are shown in Table 3.

TABLE 3

| Experiment No. | Fatty acid Type | Adhering Amount (%) | Average Agglomeration Particle Size (μm) | Addn. Amt. (%) | Amount of Yarn Breakage (times/hr) | Extruding Pressure Rise Rate (kg/cm²) | Discoloration Degree After Treatment with Tannin | Swell After Chlorine Immersion Treatment (%) | Chlorine Resistance (hr) |
|---|---|---|---|---|---|---|---|---|---|
| Ex. 3-1 | stearic acid | 3.0 | 8.8 | 3.0 | 0.10 | 1.7 | 4 | 38 | 65 |
| Comp. Ex. 5 | — | — | 1 | 15.0 | 3.0 | >100 | 5 | 48 | 59 |

Note:
Addn. Amt. = Addition Amount the amount of breakage having taken place during spinning for 24 hours. The extruding pressure rise ratio designates the rise (kg/cm²) of an extruding pressure per day when a metal mesh filter of 400 mesh was used as the filter medium.

Example 4

The procedure of Example 1 was repeated, except that a hydrotalcite which was wet ground and to which a fatty acid was adhered was used, in place of the chlo-

TABLE 1

| Experiment No. | Fatty acid Type | Adhering Amount (%) | Average Agglomeration Particle Size (μm) | Addn. Amt. (%) | Amount of Yarn Breakage (times/hr) | Extruding Pressure Rise Rate (kg/cm²) | Discoloration Degree After Treatment with Tannin | Swell After Chlorine Immersion Treatment (%) | Chlorine Resistance (hr) |
|---|---|---|---|---|---|---|---|---|---|
| Ex. 1-1 | stearic acid | 1.0 | 9.2 | 3.0 | 0.25 | 3.0 | 3 | 37 | 68 |
| Ex. 1-2 | stearic acid | 3.0 | 8.3 | 3.0 | 0.06 | 1.4 | 2–3 | 34 | 65 |
| Ex. 1-3 | stearic acid | 5.0 | 7.8 | 3.0 | 0.04 | 1.3 | 2–3 | 33 | 62 |
| Ex. 1-4 | lauric acid | 3.0 | 9.1 | 3.0 | 0.15 | 2.0 | 3 | 35 | 64 |
| Ex. 1-5 | palmit acid | 3.0 | 8.5 | 3.0 | 0.08 | 1.8 | 2–3 | 34 | 66 |
| Ex. 1-6 | behenic acid | 3.0 | 8.0 | 3.0 | 0.05 | 1.4 | 2–3 | 33 | 63 |
| Ex. 1-7 | stearic acid | 3.0 | 8.3 | 0.5 | 0.03 | 0.3 | 2 | 29 | 32 |
| Ex. 1-8 | stearic acid | 3.0 | 8.3 | 1.0 | 0.04 | 0.6 | 2 | 31 | 45 |
| Ex. 1-9 | stearic acid | 3.0 | 8.3 | 5.0 | 0.20 | 3.0 | 3 | 36 | 82 |
| Comp. Ex. 1 | — | — | 13.2 | 1.0 | 20 | 32 | 3 | 40 | 42 |
| Comp. Ex. 2 | — | — | 13.2 | 3.0 | 48 | >100 | 3–4 | 43 | 60 |
| Comp. Ex. 3 | — | — | — | 0 | <0.01 | 0.1 | 1 | 28 | 15 |

Note:
Addn. Amt. = Addition Amount

Example 2

The procedure of Example 1 was repeated, except that a hydrotalcite having the following formula (8) to rine deterioration inhibitor in Example 1. The result are shown in Table 4. The wet grinding was carried out in dimethylacetamide solvent using an apex mill (trade name of AM-1, manufactured by Kotobuki Eng. & Mfg. Co., Ltd.) and zirconia balls at 1,900 rpm for 20 hours to give a 13 wt. % dope.

$$Mg_{4.5}Al_2(OH)_{13}CO_3 \cdot 3.5H_2O \qquad (10)$$

The polymer solution was dry spun at a rate of 600

TABLE 4

| Experiment No. | Fatty acid Type | Adhering Amount (%) | Average Agglomeration Particle Size (μm) | Addn. Amt. (%) | Amount of Yarn Breakage (times/hr) | Extruding Pressure Rise Rate (kg/cm²) | Discoloration Degree After Treatment with Tannin | Swell After Chlorine Immersion Treatment (%) | Chlorine Resistance (hr) |
|---|---|---|---|---|---|---|---|---|---|
| Ex. 4-1 | stearic acid | 1.0 | 3.4 | 3.0 | 0.02 | 0.3 | 2–3 | 34 | 67 |
| Ex. 4-2 | stearic acid | 3.0 | 3.0 | 3.0 | <0.01 | 0.1 | 2–3 | 34 | 69 |
| Ex. 4-3 | stearic acid | 5.0 | 3.0 | 3.0 | <0.01 | 0.1 | 2–3 | 33 | 64 |
| Ex. 4-4 | lauric acid | 3.0 | 3.5 | 3.0 | <0.01 | 0.1 | 2–3 | 35 | 65 |
| Ex. 4-5 | palmitic acid | 3.0 | 3.2 | 3.0 | <0.01 | 0.1 | 2–3 | 34 | 67 |
| Ex. 4-6 | behenic acid | 3.0 | 3.1 | 3.0 | <0.01 | 0.1 | 2–3 | 33 | 64 |
| Ex. 4-7 | stearic acid | 3.0 | 3.0 | 1.0 | <0.01 | 0.1 | 2 | 30 | 45 |
| Ex. 4-8 | stearic acid | 3.0 | 3.0 | 5.0 | 0.02 | 0.2 | 3 | 37 | 85 |

Note: Addn. Amt. = Addition Amount

Example 5

Under a nitrogen gas stream, 125 parts of a polyester diol having a molecular weight of 1,500 and prepared from 1,6-hexanediol, neopentyl glycol and adipic acid and 31.2 parts of 4,4'-diphenylmethane diisocyanate were reacted with each other with stirring at 95° C. for 90 minutes to obtain a prepolymer having remaining isocyanate groups. The prepolymer was cooled to room temperature, and 281 parts of dried dimethylacetamide was added thereto to dissolve the prepolymer and obtain a prepolymer solution.

On the other hand, 2.34 parts of ethylenediamine and 0.37 part of diethylamine were dissolved in 185 parts of dried dimethylacetamide, and the resultant solution was added to the prepolymer solution at room temperature to obtain a polyurethane solution having a viscosity of 1,510 poise at 30° C.

A dope containing 2% of 4,4'-butylidenebis(3-methyl-6-t-butylphenol), 0.7% of 2-(2'-hydroxy-3'-t-butyl-5'-methylphenyl)-5-chlorobenzotriazole and 13% by weight of a hydrotalcite of the following formula (10) to which a fatty acid listed in Table 5 was adhered and prepared by dispersing these substances mentioned above in dimethylacetamide using a homomixer was added to the viscous polymer solution thus obtained.

m/min at a hot air temperature of 330° C. to give a yarn of 40 denier/5 filaments.

The results are shown in Table 5.

TABLE 5

| Experiment No. | Fatty acid Type | Adhering Amount (%) | Average Agglomeration Particle Size (μm) | Addn. Amt. (%) | Amount of Yarn Breakage (times/hr) | Extruding Pressure Rise Rate (kg/cm²) | Discoloration Degree After Treatment with Tannin | Swell After Chlorine Immersion Treatment (%) | Chlorine Resistance (hr) |
|---|---|---|---|---|---|---|---|---|---|
| Ex. 5-2 | stearic acid | 3.0 | 8.3 | 3.0 | 0.10 | 1.5 | 2–3 | 35 | 78 |
| Comp. Ex. 6 | — | — | 13.2 | 3.0 | 56 | >100 | 3–4 | 45 | 75 |
| Comp. Ex. 7 | — | — | — | 0 | <0.01 | 0.1 | 1 | 29 | 30 |

Note: Addn. Amt. = Addition Amount

Example 6

The procedure of Example 5 was repeated, except that a hydrotalcite which was wet ground in the same manner as in Example 4 and to which a fatty acid was adhered was used, in place of the chlorine deterioration inhibitor of Example 5.

The results are shown in Table 6.

TABLE 6

| Experiment No. | Fatty acid Type | Adhering Amount (%) | Average Agglomeration Particle Size (μm) | Addn. Amt. (%) | Amount of Yarn Breakage (times/hr) | Extruding Pressure Rise Rate (kg/cm²) | Discoloration Degree After Treatment with Tannin | Swell After Chlorine Immersion Treatment (%) | Chlorine Resistance (hr) |
|---|---|---|---|---|---|---|---|---|---|
| Ex. 6-2 | stearic acid | 3.0 | 3.2 | 3.0 | <0.01 | 0.1 | 2–3 | 34 | 78 |

Note: Addn. Amt. = Addition Amount

Example 7

Under a nitrogen gas stream, 1,500 parts of a copolycarbonate diol having hydroxyl groups at both molecular ends and having the formula (11), 240 parts of 4,4'-diphenylmethane diisocyanate and 1,150 parts of dimethylacetamide were reacted with stirring at 40° C. for 3 hours to obtain a solution of a prepolymer solution having remaining isocyanate groups, the copolycarbonate diol having repeating units of the formulas $$-(OCH_2CH_2CH_2CH_2CH_2OCO)- \text{ and}$$
$$-(OCH_2CH_2CH_2CH_2CH_2CH_2OCO)- \qquad (11)$$

in a ratio of 55:45, and possessing a number average molecular weight of 3,000.

The solution was cooled to room temperature, and 1,900 parts of dried dimethylacetamide was added thereto to give a prepolymer solution.

On the other hand, 26.9 parts of ethylenediamine and 3.13 parts of diethylamine were dissolved in 1,780 parts of dried dimethylacetamide, and the resultant solution was added to the prepolymer solution at room temperature to obtain a polyurethane solution having a viscosity of 1,600 poise at 30° C.

A dope containing 2% of 4,4'-butylidenebis(3-methyl-6-t-butylphenol), 0.7% of 2-(2'-hydroxy-3'-t-butyl-5'-methylphenyl)-5-chlorobenzotriazole and 13% by weight of a hydrotalcite represented by the following formula (12) to which a fatty acid listed in Table 7 was adhered, and prepared by dispersing these substances mentioned above in dimethylacetamide using a homo-mixer, was added to the viscous polymer solution thus obtained.

$$Mg_{4.5}Al_2(OH)_{13}CO_3 \cdot 3.5H_2O \tag{12}$$

The polymer solution was dry spun at a rate of 600 m/min at a hot air temperature of 330° C. to give a yarn of 40 denier/5 filaments.

The results are shown in Table 7.

Example 8

The procedure of Example 7 was repeated, except that a hydrotalcite which was wet ground in the same manner as in Example 4 and to which a fatty acid was adhered was used, in place of the chlorine deterioration inhibitor in Example 7.

The results are shown in Table 8.

TABLE 8

| Experiment No. | Fatty acid Type | Adhering Amount (%) | Average Agglomeration Particle Size (μm) | Addn. Amt. (%) | Amount of Yarn Breakage (times/hr) | Extruding Pressure Rise Rate (kg/cm$^2$) | Discoloration Degree After Treatment with Tannin | Swell After Chlorine Immersion Treatment (%) | Chlorine Resistance (hr) |
|---|---|---|---|---|---|---|---|---|---|
| Ex. 8-2 | stearic acid | 3.0 | 3.0 | 3.0 | <0.01 | 0.1 | 2–3 | 32 | 110 |

Note:
Addn. Amt. = Addition Amount

[Industrial Applicability]

As mentioned above, since the polyurethane composition of the present invention can be stably spun over a long period of time and exhibits neither discoloration in the step of tannin solution treatment nor swelling during chlorine immersion treatment, it is extremely useful as a functional fiber material for foundation garments, socks, sports wear, etc.

We claim:

1. A polyurethane composition comprising 0.1 to 10% by weight, based on the weight of said polyurethane, of hydrotalcite having water of crystallization and a $C_{10}$–$C_{30}$ fatty acid adhered thereto, said polyurethane being free of a halogen-containing fire retardant, said hydrotalcite being represented by the formula (1):

$$M^{2+}{}_xAl_2(OH)_{2x+6-nz}(A^{n-})_z \cdot mH_2O \tag{1}$$

wherein $M^{2+}$ is $Mg^{2+}$ or $Zn^{2+}$, $A^{n-}$ is an anion having a valence of n, x is a positive number of at least 2, z is a positive number of 2 or less, and m is a positive number.

TABLE 7

| Experiment No. | Fatty acid Type | Adhering Amount (%) | Average Agglomeration Particle Size (μm) | Addn. Amt. (%) | Amount of Yarn Breakage (times/hr) | Extruding Pressure Rise Rate (kg/cm$^2$) | Discoloration Degree After Treatment with Tannin | Swell After Chlorine Immersion Treatment (%) | Chlorine Resistance (hr) |
|---|---|---|---|---|---|---|---|---|---|
| Ex. 7-2 | stearic acid | 3.0 | 8.3 | 3.0 | 0.08 | 1.5 | 2–3 | 34 | 108 |
| Comp. Ex. 8 | — | — | 13.2 | 3.0 | 60 | >100 | 3–4 | 43 | 102 |
| Comp. Ex. 9 | — | — | — | 0 | <0.01 | 0.1 | 1 | 27 | 60 |

Note:
Addn. Amt. = Addition Amount

* * * * *